United States Patent [19]

Malueg et al.

[11] 4,032,975
[45] June 28, 1977

[54] DETECTOR ARRAY GAIN COMPENSATION
[75] Inventors: Richard M. Malueg, Glendora; Michael J. Meier, Monrovia, both of Calif.
[73] Assignee: McDonnell Douglas Corporation, Long Beach, Calif.
[22] Filed: Feb. 25, 1974
[21] Appl. No.: 445,787
[52] U.S. Cl. .............................................. 358/213
[51] Int. Cl.² .................... H04N 3/14; H04N 5/30
[58] Field of Search ............ 178/7.1, DIG. 29, 7.2; 250/211 J, 232, 332, 211 R, 553; 357/29–32

[56] References Cited
UNITED STATES PATENTS

| | | | |
|---|---|---|---|
| 2,965,711 | 12/1960 | James et al. | 178/7.2 |
| 3,564,245 | 2/1971 | Koehler | 250/211 J X |
| 3,684,378 | 8/1972 | Lord | 250/232 X |
| 3,800,078 | 3/1974 | Cochran et al. | 178/7.1 |
| 3,800,079 | 3/1974 | McNeil et al. | 178/7.1 |
| 3,830,972 | 8/1974 | McHugh et al. | 178/7.1 |

Primary Examiner—Benedict V. Safourek
Assistant Examiner—Mitchell Saffian
Attorney, Agent, or Firm—Kleinberg, Morganstern, Scholnick & Mann

[57] ABSTRACT

In an electronic system employing an array of detectors which have been compensated for any fixed pattern noise present, further compensation is provided for any deviation in sensitivity (gain) of each detector from a standard by measuring the output of each detector under uniform level of incident energy, and comparing the amplitude measured with a standard while multiplying the measured output by a factor that is varied until the product equals the standard. The final factor is then stored for use as a gain compensation factor during normal system operation.

19 Claims, 4 Drawing Figures

DETECTOR ARRAY GAIN COMPENSATION

BACKGROUND OF THE INVENTION

This invention relates to detector array systems and more particularly to an array of detectors which tend to have a different sensitivity or gain characteristic, i.e., a different video output for a given level of energy incident on the detectors of the array.

There is an ever-increasing interest in solid-state imaging systems. These solid-state systems eliminate the need for a target electrode in conventional vidicon tubes, thus increasing basic resolution and speed capability. Upon being exposed to a light image, the typical photodetector collects the released photocharge in a p-n junction capacitance. The charge pattern can be read out without a scanning electron beam. Advantages are higher geometric accuracy, high sensitivity, higher scan rates, small size, low voltage, low power and solid-state ruggedness and reliability. Electronic circuits needed to scan the array can be formed on the silicon wafer while the array of p-n junction photodetectors is being formed using the most advanced integrated circuit technology. Such arrays are commercially available in both linear and rectangular configurations.

A typical array consists of p-n junction diodes produced in a silicon wafer as an integrated circuit with an optically transparent window. Each diode has inherent capacitance and an area which varies by as much as five percent, or more, from diode to diode. Each diode is connected to an output video line by an access switch made from an MOS field-effect transistor. A shift register is provided to sequentially turn on the access switches. In the case of a rectangular array, a second shift register can be employed to switch the output of the first shift register from one row of access switches to the next as the array is scanned row by row.

As each access switch is turned on, the inherent capacitance of its associated diode is recharged back to the video output line potential, thus replacing the charge displaced by the photocharge. The replaced charge is amplified by a charge (trans-impedance) amplifier. Once the addressing switch is again turned off, the diode capacitance will begin to discharge due to further photocurrent. The amount of discharge is proportional to the intensity of the light impinging the diode during the entire period before the access switch is again turned on. The resulting signal at the video output is a train of pulses, each pulse having an amplitude proportional to the integrated light flux impinging the diode.

The recording and/or display of the video output is conventional for such discrete sampling systems. Typically, a sample-and-hold circuit is employed to hold the amplitude of each pulse in succession to provide continuity from pulse to pulse. In practice, it is desirable to provide an integrator between the charge amplifier and the sample-and-hold circuit, and to then quantize the sample for digital control of the recording or display device.

Pulses driving the linear array addressing register are used to synchronize the recording or display device. In the case of a rectangular array, the output of a second register may be employed to synchronize the display or recording of successive rows. When all the rows have been displayed side by side, the entire cycle is repeated.

To provide for an area image with a linear array, the optics focusing the image onto the array are turned at just the proper rate to match up successive line images. This basic drive relationship is then used to generate signals for a display device, such as a cathode-ray tube or further to generate a speed command for a film recording system.

It has been found thus far that such solid-state imaging systems produce an image which is just comparable to conventional vidicon tubes. The reason is that the area under each video pulse is indicative of the amount of integrated photocurrent augmented by the random noise present in the diode and the clock noise introduced by switching the access switch on. Another reason is that it is not yet practical to produce an array of photodetectors with uniform radiant sensitivity or gain (video output as a function of illumination). The same problem is experienced with other types of detectors, such as particle detectors, sonic detectors, radiation detectors and the like. A method of compensating for the combined effects of variations in the switching capacitance and clock noise of the detectors in the array, i.e., of compensating for fixed-pattern noise, is disclosed in a copending application Ser. No. 445,802 (now U.S. Pat. No. 3,949,162) filed concurrently herewith by Richard M. Malueg, titled DETECTOR ARRAY FIXED-PATTERN NOISE COMPENSATION. Once fixed-pattern noise compensation has been introduced in the output of the array, the problem is to compensate for variation in the gain of the detectors.

SUMMARY OF THE INVENTION

In accordance with the present invention, a detector array is provided with conventional means for sequentially switching discrete detectors to a video output terminal in a fixed pattern. Once the video output of each detector has been compensated for fixed-pattern noise by subtracting from each output a premeasured noise signal measured for all detectors with a uniform low level of incident energy (preferably zero), the array is again operated in a calibrate mode with some uniform level of incident energy. The noise compensated output of each detector is multiplied by a factor which will produce a product equal to a reference. That factor is established by operating a multiplier generator from some predetermined maximum or minimum number while multiplying the output of the detector with the output of the generator, all the while comparing the product with a reference. When the product crosses the reference level, operation of the generator is terminated and its output is stored in a memory for use as a gain compensating factor during normal imaging operation of the array. In order to eliminate error from random noise in this determination of a gain compensating factor for each detector, a number of gain compensating factors may be averaged for each detector and stored in memory. In operation of the array for imaging, the stored gain compensating factor of each detector is read from memory as the array is continually scanned. The individual output signals from the array of detectors are multiplied by the respective gain compensating factors, thereby normalizing the gain of the detectors in the array for all levels of illumination above that at which the fixed-pattern noise compensation is provided.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
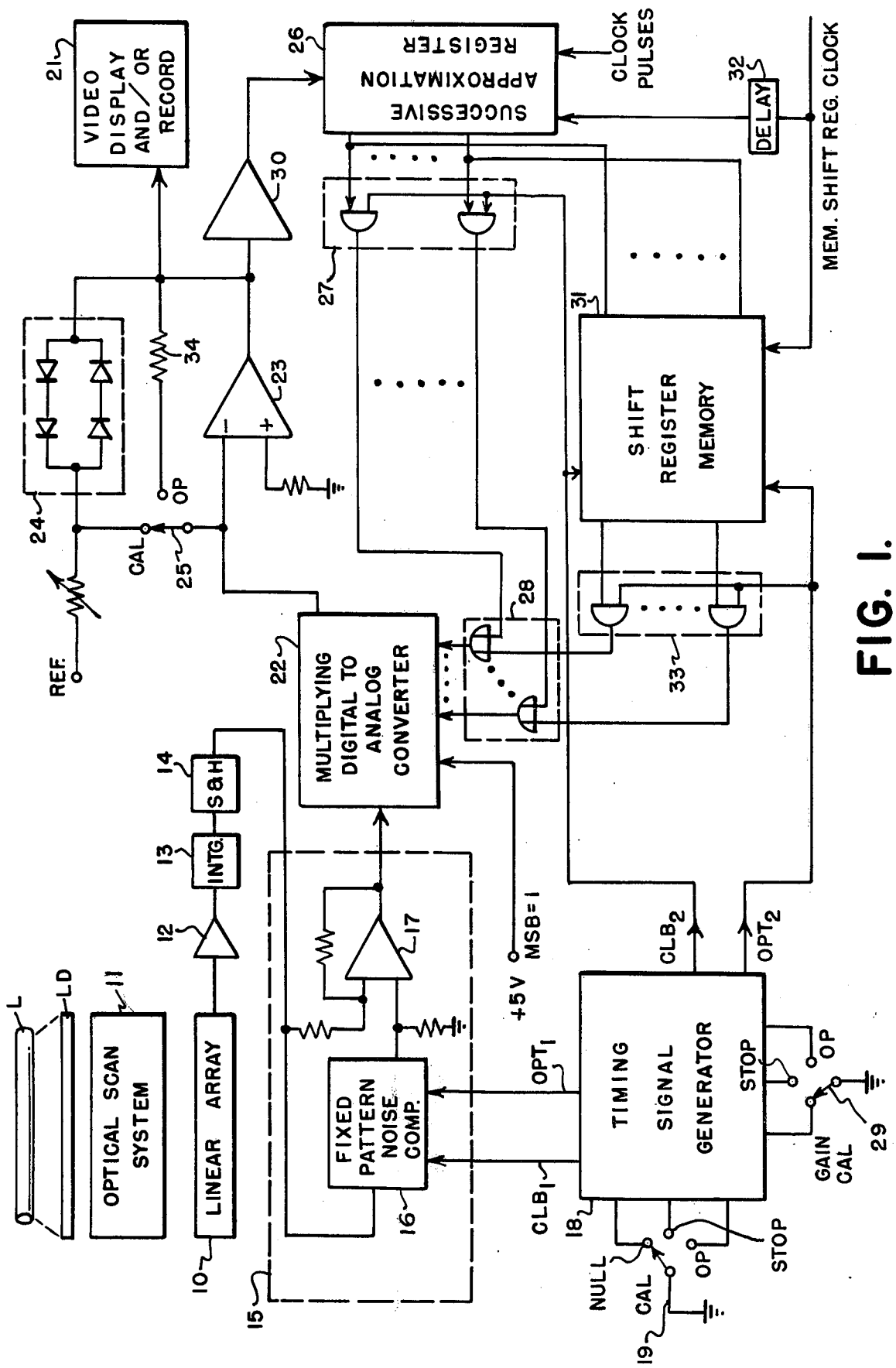
FIG. 1 is a block diagram illustrating the principles of the present invention in a photodetector array imaging system.
Figure 2A:
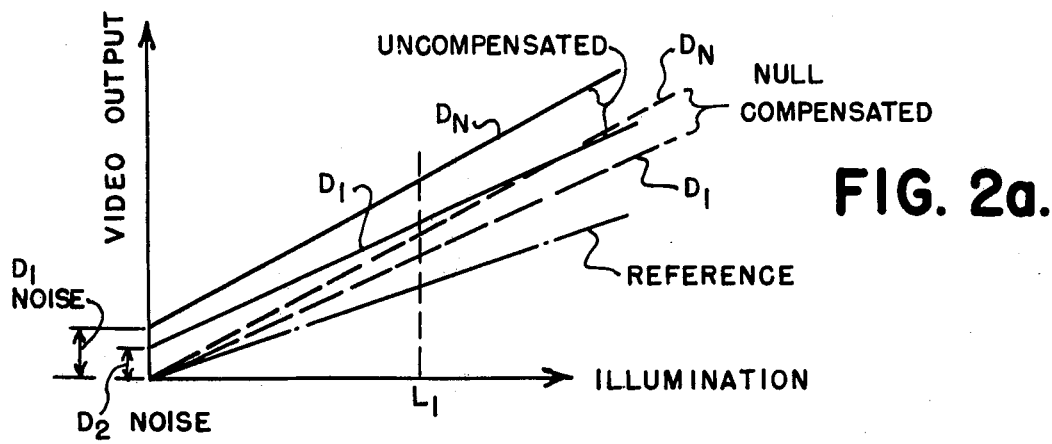
FIG. 2a and 2b are graphs of video output as a function of illumination for two photodetectors, each having a different fixed-pattern noise and gain to be compensated.

Before proceeding with a description of an exemplary embodiment of the present invention shown in FIG. 1, the nature of the problem will be described with reference to graphs of video output as a function of illumination as shown in FIG. 2a. The video output functions of two photodetectors $D_1$ and $D_N$ are shown in FIG. 2a. Note that each has a different video output when light intensity is zero. The levels of video output under that condition constitute a fixed pattern of noise which is measured and stored in memory during preliminary calibration of the array in accordance with the aforesaid copending application. Once stored, the fixed-pattern noise present during normal imaging operations can be compensated by subtracting the fixed-pattern noise from the video outputs of respective photodetectors, thus causing the video gain characteristics of the diodes to pass through the origin as shown by dotted lines in the graph of FIG. 2a. If the noise compensation measurements are made at some low level of illumination, I, instead of at zero illumination, the gain compensation causes the video output functions of all detectors to be shifted down to where the video output of each detector is zero at the level of illumination I as shown by dotted lines in FIG. 2b for two photodetectors $D_1$ and $D_N$. The purpose of the gain compensation to be provided in accordance with the present invention is to cause the null compensated video output of each diode to have substantially the same video output as a function of illumination as some predetermined reference shown in FIGS. 2a and 2b.

Figure 2B:
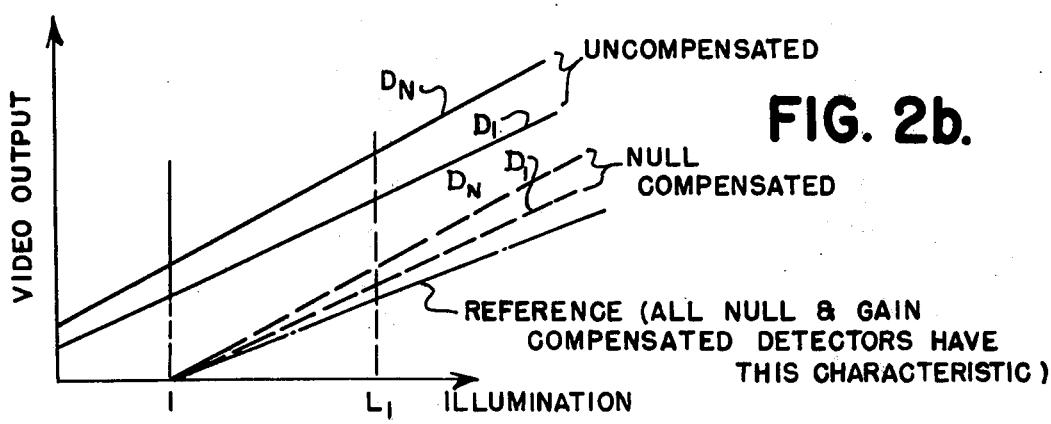

During a normal imaging operation, the noise-compensated video output of each of the photodetectors will not be equal for the same level of illumination because of a difference in the sensitivity (gain) between the photodetectors as represented by the difference in the slopes of the video output characteristics shown in FIGS. 2a and 2b. The video output characteristics are assumed to be linear as shown, which is a valid assumption over at least some useful range of illumination. To compensate for this difference in gain, all of the photodetectors of the array are illuminated at a uniform level $L_1$ for gain compensation measurement, once fixed-pattern noise compensation has been introduced. Gain compensation can then be introduced in the noise compensated video output signals to cause all gain characteristics to have the same slope as the reference.

The process of gain compensation measurement consists of making one or more measurements of the video output for each diode of the array at the level $L_1$, multiplying the video output by a variable factor, comparing the product with a reference while varying the factor, and retaining the value of the variable factor which makes the product substantially equal to the reference. The value of the factor thus retained is then used as a gain compensation during normal imaging operations. The gaincompensation factors are stored in an addressable memory so that they may be read out in synchronism with the scanning of respective diodes in the array. If noise compensation is not first introduced, the video output of each photodetector can be measured at two known levels of illumination. From those two measurements, the actual gain (slope) can be determined for the video output of each detector and compared with a standard to determine a proper gain compensation factor.

In determining the gain compensation factor by comparision of the product while varying a multiplier, the multiplier may be a number greater than or less than unity. If greater than unity, the gain factor is determined by progressively increasing the variable multiplier during calibration until the product of the variable and the video output crosses the reference level. If less than unity, as in the preferred embodiment of FIG. 1, the variable is decreased progressively until the product of the variable and the video output crosses the reference level. This technique of determining when the product crosses the reference level is used in order to be able to vary the multiplier in quantized steps. If each step is very small, the multiplier which causes the product to cross the reference will be that which makes the product substantially equal to the reference.

Referring now to FIG. 1, an imaging system is disclosed comprised of a linear array 10 of photodetectors, which are shown in the aforesaid copending patent application as p-n junction diodes that may be produced in a silicon wafer as an integrated circuit together with necessary access circuitry. An optical scanning system 11 is provided for focusing a light image in the plane of the array and deflecting the focused image over the array.

A linear array has been selected to illustrate the principles of the present invention because, as will become apparent from the following description, the principles are fully demonstrated with just a linear array. Those principles are directly applicable to an area array since in both cases the train of video pulses on a common output line are derived from diodes repeatedly scanned in a fixed pattern.

The video output of each diode is connected by the access circuitry of the linear array to the input of a transimpedance (charge or current) amplifier 12. The video output of each diode is a negative pulse, the total energy of which is proportional to the intensity of the light on the diode during the last scan cycle. An integrator 13 receives the video output pulses to obtain signals proportional in amplitude to the intensity of light. The output of the integrator is sampled at the end of the integration period for each diode and held by a circuit 14 for display and/or recording.

Means for providing fixed-pattern noise compensation, i.e., for providing null compensation, is provided in accordance with the teachings of the aforesaid copending application. That means, enclosed by a dotted line block 15, is comprised of circuitry represented by a functional block 16 for measuring and storing null compensation values during a calibration scan of all diodes under a low uniform level condition of illumination (preferably zero), and for thereafter reading out of memory null compensation values to be synchronously subtracted from video output signals via a differential amplifier 17.

A timing signal generator 18 provides all the control and timing signals for the synchronous operation of the linear array 10, integrator 13, sample-and-hold circuit 14 and fixed-pattern noise (null) compensation network 16. Only the control signals are shown, which are: a calibrate control signal, $CLB_1$, transmitted to the network 16 for a predetermined number of complete scan cycles (one or more) while null compensation measurements are made and stored; and an operate control signal, $OPT_1$, transmitted to the network 16 for normal imaging operation to read out of memory the stored null compensation values to be subtracted from the video signals of the diodes. The control signals $CLB_1$ and $OPT_1$ are caused to be transmitted by a manual switch 19 in the respective calibrate, CAL, and operate, OP, positions, A third intermediate position, STOP, is provided to assure that the memory addressing system of the null compensation network stops after addressing the last memory location in synchronism with accessing the last diode. The linear array is being continuously scanned, but operation of the null compensation network will not commence for either calibration or normal operation until the first diode of the array is again to be accessed after the switch 19 is placed in the CAL or OP position.

Once null calibration has been completed and the switch 19 is placed in the operate (OP) position, the differential amplifier 17 transmits null compensated video signals, i.e., signals from the diodes which have been compensated for fixed-pattern noise such that gain characteristics of each either passes through the origin of a graph of video output versus illumination, or through a point of zero video output at some fixed low level of illumination as illustrated in FIGS. 2a and 2b. The balance of the system shown in FIG. 1 is controlled by a switch 29 to calibration for and application of gain compensation to cause the video output of each diode to have a uniform gain or sensitivity, i.e., to cause the slope of the graph of video output as a function of illumination to be substantially equal to a standard or reference slope.

Before proceeding with a description of an exemplary embodiment of gain compensation in accordance with the present invention, the optical scan system and linear array will first be described in more detail. As the optical scan system 11 scans horizontally through a predetermined arc, the linear array 10 is repeatedly scanned to provide columns of video information to be displayed and/or recorded side-by-side in a video display and/or record system 21. To provide for a rectangular image with a linear array, the optics focusing the image onto the array is turned at just the proper rate to match up successive column images. This basic drive relationship is then used to generate signals for a display device, such as a cathode-ray tube or further to generate a speed command for a film recording system.

If the imaging system is to be employed as a camera, it is stopped after one full cycle of the optical scan system until the optical scan system is reset and the timing signal generator 18 is restarted in the operate mode. For repeated scanning to display and/or record images somewhat in the manner of commercial television, the timing signal generator may be implemented to re-initiate the complete scanning operation by resetting the optical scan system and continuing to scan the linear array of diodes. If a video output signal is desired for use in a commercial television system, it would be necessary to store the video output signal of this linear array and optical scan system in a scan converter that provides a video output in conventional rasters.

The foregoing discussion has been solely for the purpose of placing the present invention in a proper environment. The present invention, which relates to providing gain compensation, will now be described. To calibrate for gain compensation, the switch 19 is placed in the operating position, OP, in order for the timing signal generator 18 to transmit an operate mode control signal $OPT_1$ to the noise compensation network for operation in a normal imaging mode. The amplifier 17 then transmits video signals which have been null compensated, i.e., compensated for fixed pattern noise, while the timing signal generator 18 transmits timing signals for continually and repeatedly scanning the linear array 10 in the normal manner. However, for gain calibration, the array is illuminated uniformly at light level $L_1$ shown in FIGS. 2a and 2b by a lamp, L, of predetermined intensity through a light diffuser, LD.

The video output signal of the amplifier 17 which has been null compensated is applied to a multiplying digital-to-analog converter (MULT DAC) 22.

The MULT DAC is a digitally controlled attenuator consisting of a digital to analog converter for converting an input variable factor in digital form to an attenuation, and an attenuation network, whose compoenents are selectively employed in accordance with the magnitude of the digits of the digital input, for attenuating an analog input signal. There the video output is multiplied by a variable factor in digital form for comparison of the product with a reference voltage. That comparision is made by an operational amplifier 23 having +1 volt diode limiter 24 in the feedback path while a swtich 25 is in a gain calibrate position (CAL) as shown. The output of the amplifier 23 remains at a +1V level until the product of the video output from the amplifier 17 and the variable factor is less than the reference voltage applied to a terminal REF. When that product crosses the reference voltage, the output of the amplifier 23 drops quickly to −1V.

The variable gain factor first applied to the multiplying digital-to-analog converter during the scanning period of a photodetector is initially set at a binary number of 0.1100 . . . 0 by an ARRAY CLOCK from the generator 18 which advances the access to the linear array from one photodetector to the next. That binary number is selected initially and variations from this value are determined one bit at a time beginning with the second most significant bit. The first bit is hard-wired to a logical one since it represents gain variations of greater than 50% which normally do not occur. The remaining binary digits (bits) are determined by successive approximations in a register 26 through a bank of AND gates 27 and a group of OR gates 28. The AND gates 27 are enabled by a gain calibrate signal, $CLB_2$, produced by the generator 18 while the gain calibration switch 20 is in the gain calibration position shown.

Successive approximation register 26 is a form or register well-known in the art, and described on pages II-80 to II-83, inclusive of "Analog-to-Digital Conversion handbook", edited by David H. Sheingold, published by Analog Devices, Inc. Norwood, Mass, 02062 (1972), Library of Congress, Catolog No. 72,85817.

The successive approximations register 26, which in this exemplary embodiment consists of ten binary stages, is preset with a binary one at each successive stage by the ARRAY CLOCK pulse from the generator 18 starting with the most significant bit (MSB). Clock pulses produced by the timing signal generator 18 at a higher rate then cause the register 26 to test the second MSB and then the third MSB, and so on, until all the bits of register 26 have been selected. For example, after the first clock time, the second MSB is left a logic one if amplifier 30 is a logic zero. If amplifier 30 is a logic one, then the second MSB is reset to a zero. The trailing edge of the first clock pulse loads a logic one into the third MSB and one clock time later the third MSB remains a logic one or is reset, depending on the polarity of amplifier 30. In this fashion ten clock pulses are required internal to one video clock time to determine the gain factor required for each detector.

Upon the occurrence of the next memory shift register clock pulse, which occurs just before the next ARRAY CLOCK pulse, the content of the register 26 is stored in a shift register memory 31. The same pulse delayed by a delay element 32 then resets the register 26 to its initial state of 100000...0 to begin the process of determining the gain calibration factor for the next photodetector of the array. It should be noted that during gain calibration, the control signal $CLB_2$ causes the shift register memory to operate open loop, so that as new gain calibration factors are being stored, the old factors are being shifted out of the memory.

Once all photodetectors of the array 10 have been accessed (as determined, for example, by a counter in the timing signal generator 18 which counts ARRAY CLOCK pulses while the flip-flop $CLB_2$ is set), the flip-flop $CLB_2$ is reset. That flip-flop is set when the switch 29 is placed in the GAIN CAL position shown in a similar manner that the $CLB_1$ flip-flop is set for null calibration when the swtich 19 is placed in the NULL CAL position shown. Briefly, a flip-flop, RQ, is set by the switch 29 placed in the GAIN CAL position. The RQ flip-flop is then reset by the next START pulse produced automatically by the timing signal generator to start the next array scanning cycle. At the same time the $CLB_2$ flip-flop is set.

Once the gain calibrate signal, $CLB_2$, is terminated, the bank of AND gates 27 is disabled. All of the gain calibration factors for the linear array of photodetectors are by then stored in the memory 31. Thereafter, to operate in the normal imaging mode, the switched 19 and 29 are placed in the operate (OP) position.

The switch 29 enables the generator 18 to transmit an operation signal, $OPT_2$, to the memory 31 and a bank of AND gates 33 connected to the bank of OR gates 28. The signal $OPT_2$ places the memory 31 in the read mode and enables the AND gates 33 to couple the output of the memory 31 to the multiplying DAC 22 via the OR gates 28 as the successive memory locations of the shift register memory 31 are addressed during one or more subsequent scanning cycles of the linear array 10.

The switch 25 disconnects the diode limiter and connects a feedback resistor 34 to the input of the summing amplifier 23. The magnitude of the feedback resistor 34 may be selected to provide whatever system gain is desired for the normal imaging mode of operation.

Figure 3:
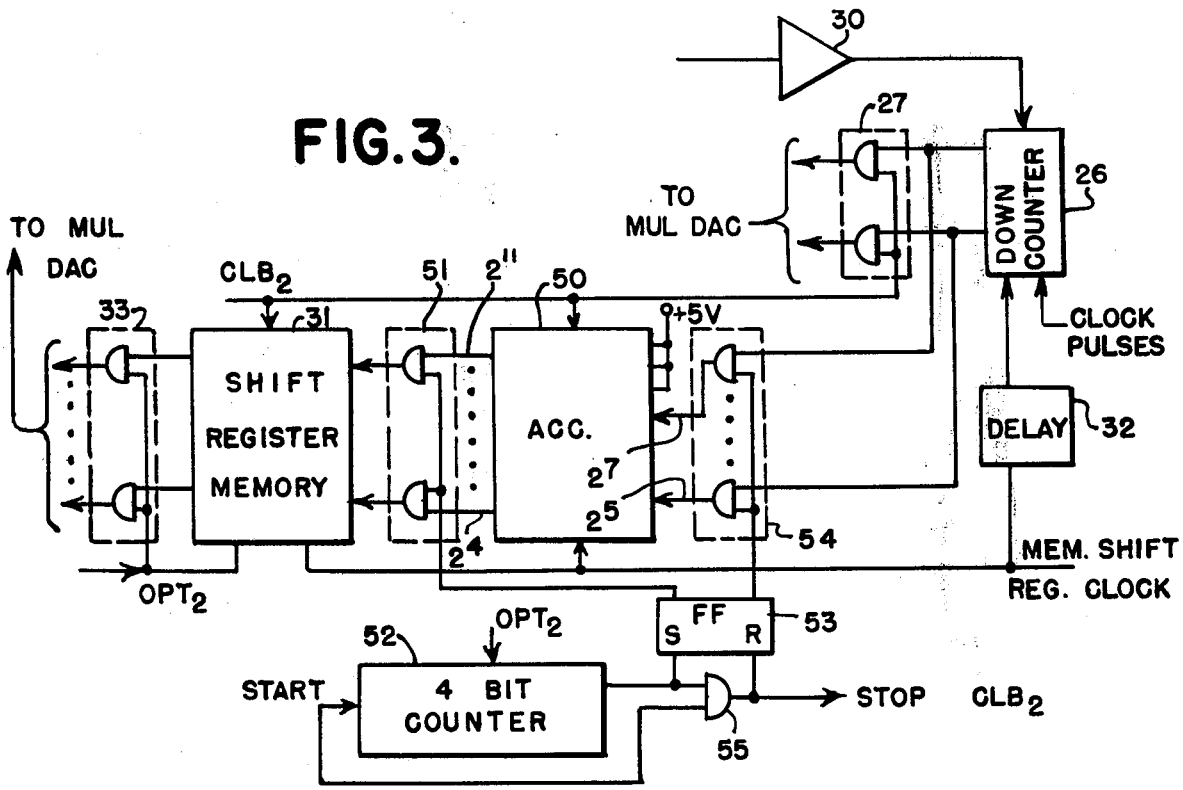
FIG. 3 is a block diagram of a modification of the system of FIG. 1 for obtaining a plurality of gain calibration measurements and storing an average of the measurements for gain compensation.

Referring now to FIG. 3, a modification of the system of FIG. 1 will be described for averaging a number of gain calibration cycles in order to eliminate from the gain calibration measurements any random noise that may be present. An accumulator 50 enabled by the gain calibration signal $CLB_2$ is connected between the output of the register 26 and the bank of AND gates 27. The output of the accumulator is connected to the shift register memory 31 through a bank of AND gates 51 which are enabled by the output of the last stage of a binary counter 52 via a flip-flop 53. Assuming that sixteen gain calibration cycles are to be averaged, the counter 52 is provided as a 4-bit counter incremented by start pulses applied to the linear array 10 by the timing signal generator to start successive array scan cycles. When sixteen array cycles have been completed and gain calibration values accumulated for each photodetector, the counter 52 sets the flip-flop 53 which enables the AND gates 51. The compliment of the output signal from the flip-flop 53 disables a group of AND gates 54 which connect the accumulator 50 to the register 26. During the next array scan cycle, MEMORY SHIFT REGISTER pulses shift the contents of the accumulator 50 into the shift-register memory 31.

The accumulator 50 is conventional, and may be comprised of a plurality of recirculating registers operating in parallel, one recirculating register for each binary digit of a maximum sum to be accumulated. If sixteen gain calibration measurements are to be made from a given diode, each measurement having a maximum of ten binary digits, there would be 14 recirculating shift registers in the accumulator. All 14 shift registers recirculate in parallel through a parallel binary adder at the input of the accumulator. The AND gates 54 connecting the register 26 to the accumulator are connected to bit positions $2^0$ through $2^9$ of the adder at the addend inputs thereof. The remaining addend inputs are wired to provide bit zeros at positions $2^{10}$ through $2^{13}$. The augend inputs $2^0$ through $2^{13}$ of the adder are connected to the outputs of the 14 shift registers.

In response to each MEMORY SHIFT REGISTER CLOCK pulse, the 14 shift registers of the accumulator are advanced, thus entering accumulated sums of detector gain calibration measurements in the recirculating registers until a carry output appears from the last stage of the counter 52 to set the flip-flop 53. Once that flip-flop is set, gates 54 are disabled and gates 51 are enabled for one diode array scan cycle to transfer the contents of the accumulator to the shift register memory as just described. The adder of the accumulator is also disabled by the flip-flop 53 while it is set. The next START pulse is then transmitted by an AND gate 55 as a STOP $CLB_2$ signal to set the flip-flop 53 and rest the $CLB_2$ flip-flop in the signal generator 18. Note that with the adder disabled and the gates 54 disabled, the accumulator is cleared as its contents are transferred to the shift-register memory and remain cleared until the next gain calibration because $CLB_2$ is thereafter no longer present to enable the accumulator.

The step of dividing by sixteen in order that an average gain measurement of a given photodetector be stored in the memory 31, instead of the accumulated sum of sixteen gain calibration cycles, is carried out automatically by taking the 10-bit output for storage in memory from the ten most significant bit positions $2^4$ through $2^{13}$. If a larger number of samples are to be averaged, a larger accumulator and scan counter would be required, but the outputs to the memory would still be taken from the most significant bit positions. The only restriction in the number N of samples that may be averaged in this manner is that N be some power of two. Otherwise, some other more sophisticated system would be required for dividing by a number other than some power of two. However, such other more sophisticated systems are known and economically feasible through the use of integrated circuit technology. Consequently, the technique for averaging N gain calibration measurements illustrated in FIG. 3 is not to be construed as a limitation on the present invention in its broadest aspects.

Although particular embodiments of the invention have been described, it is recognized that other modifications and variations may readily occur to those skilled in the art. In particular, it is recognized that the concept of the present invention is applicable to arrays of detectors of all types, and not just to arrays of photodetectors. Hence, it is intended that the invention be interpreted to include such and other modifications and variations, and that its scope be determined in accordance with the following claims.

What is claimed is:

1. Apparatus for normalizing the gain utilized with each detector of a radiation detector system employing a plurality of detectors, comprising:
   a. calibration means for illuminating each of said plurality of detectors of the system with radiation of known intensity and spectral characteristics in response to a calibrate signal;
   b. sampling means coupled to the detectors for selectively presenting the output of each detector in response to sampling signals;
   c. an amplifier having a controllable gain, conected to said sampling means, to produce an amplified signal whose amplitude equals the product of the controllable gain and the sampled detector output;
   d. a source of reference signal;
   e. comparison means connected to said amplifier and to said reference signal and operable in response to a calibrate signal, for comprising the amplified signal from said amplifier with the reference signal and to issue a stop signal when they are equal;
   f. means connected to said amplifier and to said comparison means for varying the controllable gain of said amplifier until said comparison means issues the stop signal;
   g. storage means coupled to said amplifier and to said comparison means for storing the gain of said amplifier in response to the stop signal issued by said comparison means;
   h. read-out means connected to said storage means for selectively recalling the stored gain in response to a recall signal;
   i. correcting means connected to said read-out means to receive the recalled gain and to said amplifier, operable when the detectors are illuminated by radiation of unknown intensity and spectral characteristics, for producing a normalized detector output from the recalled gain and the output of said amplifier; and
   j. timing signal generator for generating in a predetermined sequence the sampling, calibrate and recall signals, and connected to said calibration means and said comparison means for presenting to them calibrate signals, and connected to said read-out means and said sampling means for presenting to them recall signals and sampling signals, respectively.

2. The apparatus of claim 1 further including averaging means connected to said storage means for calculating an average gain from repeated gain determinations made for each detector of the plurality of detectors.

3. The apparatus of claim 1 wherein the detector system further comprises means for biasing the output of each detector to zero when no radiation illuminates the detectors.

4. The apparatus of claim 1 wherein said detectors are semiconductor photodiodes having internal charge storage of radiation induced charge.

5. A method for normalizing the gain of each detector of a radiation detector system employing a plurality of detectors, comprising the steps of:
   a. illuminating a detector of the system with radiation of known intensity and spectral characteristics;
   b. sampling the output signal of the detector while it is thus illuminated;
   c. amplifying the sampled output by an amplifier having a controllable gain, to obtain an amplified signal whose amplitude equals the product of the controllable gain and the sampled output;
   d. varying the controllable gain until a corresponding value of it is determined for which the amplified signal equals a predetermined constant magnitude;
   e. storing the value of the corresponding controllable gain thus determined in a memory for non-destructive read-out;
   f. illuminating said detector with radiation of unknown intensity and spectral characteristics;
   g. reading out the stored controllable gain value;
   h. setting the gain of a controllable gain amplifier equal to the corresponding controllable gain value read-out; and
   i. applying the video output of said detector to the amplifier whose gain has been set in step h), to obtain a normalized output signal for said detector.

6. The method of claim 5 further comprising the steps of:
   repeating, for each detector, steps a) through d) a predetermined number of times and averaging the values of the controllable gain thus determined, the average value being stored in the succeeding step e).

7. The method of claim 5 further including the steps of isolating the detectors from all radiation and then biasing the outputs of the detectors to zero, these steps preceding step a) of claim 5.

8. The method of claim 5 wherein the steps prior to step (f) are executed upon each detector of the plurality of detectors before step (f) is applied to any detector.

9. The method of claim 8 wherein the steps prior to step f) are executed each detector of the plurality of detectors, then step f) is executed for each detector of the plurality of detectors, then step g) is executed for each detector of the plurality of detectors, and then steps h) and i) are executed for each detector of the plurality of detectors.

10. The method of claim 5 wherein the radiation detector system comprises an array of semiconductor photodiodes each having internal charge storage of radiation induced charge.

11. Apparatus for normalizing the gain utilized with each detector of a detector system employing a plurality of detectors, comprising:
   a. calibration means for applying predetermined stimuli to the detectors in response to a calibrate signal;
   b. gate means connected to the detectors for selectively presenting the output of each detector in response to gate signals;
   c. gain value determining means connected to said gate means and operable in response to a calibrate signal for producing a gain determining value from the output of each detector presented by said gate means;
   d. storage means connected to said gain value determining means for storing each gain determining value;
   e. read-out means connected to said storage means for selectively recalling each stored gain determining value in response to a recall signal;
   f. correcting means connected to said gate means and said read-out means, operable when the detectors are exposed to stimuli of unknown magnitudes for producing a gain correct output from the output of a detector and from the corresponding recalled gain determining value for that detector; and
   g. timing signal generating means for generating in a predetermined sequence the calibrate, gate and recall signals, and connected to said calibration means and said gain determining means for presenting to them the calibrate signal, and connected to said gate means and said recall means for presenting to them the gate and recall signals, respectively.

12. The apparatus of claim 11 further including averaging means connected to said storage means for calculating an average gain determining value from repeated gain determinations made for a particular channel and for storing the average value in said storage means as the corresponding stored gain to be recalled by said read-out means.

13. The apparatus of claim 11 wherein the detector system further comprises means for biasing the output of each detector to zero when no stimulus is applied to that detector.

14. A method for normalizing the gain utilized with a detector Di in a detector system employing a plurality of detectors, comprising the steps of:
   a. applying a predetermined stimulus Pi to a detector Di of the system;
   b. sampling the output signal Bi of the detector while detector Di reacts to the predetermined stimulus;
   c. producing a gain determining value from the output Bi of the detector;
   d. repeating steps a), b) and c) in order a predetermined number of times for the detector Di of the system and averaging the gain determining values obtained each time those steps are repeated for the detector Di to produce a corresponding average gain determining value for the detector Di;
   e). storing the average gain determining value for detector Di;
   f). applying a stimulus Ui of unknown magnitude to the detector to produce an output signal Si;
   g). recalling the stored average gain determining value for detector Di; and
   h). producing a normalized output Si' for detector Di from the recalled gain determining value and the output signal Si.

15. The method of claim 14 further including the steps of isolating the detectors from all stimuli and then biasing the outputs of the detectors to zero, these steps preceding step (a) of claim 14.

16. The method of claim 14 wherein the steps prior to step f) are executed upon each detector of the plurality of detectors before step f) is applied to any detector.

17. The method of claim 16 wherein after the steps prior to step (f) have been executed for each detector of the plurality of detectors, then steps (f), (g) and (h) are executed for each detector of the plurality of detectors.

18. The method of claim 17 wherein after the operations of the steps prior to step (f) have been applied to each detector of the plurality of detectors, step (f) is first applied to each detector of the plurality of detectors, then step (g) is applied to each detector of the plurality of detectors and finally step (h) is applied to each detector of the plurality of detectors.

19. A method for normalizing the gain utilized with each detector $D_i$ in a detector system employing a plurality $n$ of detectors $D_{i=1}$, $D_{i=2}$ ---- $D_{i=n}$, comprising the steps of:
   a. applying a predetermined stimulus $P_i$ to each detector $D_i$ of the system;
   b. sampling the corresponding output signal $B_i$ of each detector $D_i$ while each detector $D_i$ reacts to the predetermined stimulus;
   c. producing a corresponding gain determining value from the output $B_i$ of each detector $D_i$;
   d. repeating steps (a), (b), and (c) in order a predetermined number of times for each detector $D_i$ of the system and averaging the gain determining values obtained each time those steps are repeated for each detector $D_i$ to produce a corresponding average gain determining value for each detector $D_i$;
   e. storing the corresponding average gain determining value for each detector $D_i$;
   f. applying a stimulus $U_i$ of unknown magnitude to each detector $D_i$ to produce a corresponding output signal $S_i$;
   g. recalling the stored average gain determining value for each detector $D_i$; and
   h. producing a normalized output $S_i$, for each detector $D_i$ from the corresponding recalled average gain determining value and the output signal $S_i$.

* * * * *

UNITED STATES PATENT OFFICE
CERTIFICATE OF CORRECTION

PATENT NO. : 4,032,975
DATED : 28 June 1977
INVENTOR(S) : Richard M. Malueg et al.

It is certified that error appears in the above-identified patent and that said Letters Patent are hereby corrected as shown below:

Column 4, line 7, "gaincompensation" should read --gain compensation--. Column 7, line 49, "switched" should read --switches--. Column 9, line 41, "comprising" should read --comparing--. Column 11, line 24, "correct" should read --corrected--.

Signed and Sealed this

Eighth Day of November 1977

[SEAL]

Attest:

RUTH C. MASON
Attesting Officer

LUTRELLE F. PARKER
Acting Commissioner of Patents and Trademarks